(12) United States Patent
Wong (10) Patent No.: US 11,853,486 B2
(45) Date of Patent: Dec. 26, 2023

(54) STYLUS AND POSITION CALCULATION METHOD

(71) Applicant: Wacom Co., Ltd., Saitama (JP)

(72) Inventor: Henry Wong, Mill Creek, WA (US)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 17/399,970

(22) Filed: Aug. 11, 2021

(65) Prior Publication Data

US 2021/0373680 A1   Dec. 2, 2021

Related U.S. Application Data

(63) Continuation of application No. 16/694,952, filed on Nov. 25, 2019, now Pat. No. 11,119,589.

(60) Provisional application No. 62/785,125, filed on Dec. 26, 2018.

(51) Int. Cl.
| | |
|---|---|
| *G09G 5/08* | (2006.01) |
| *G06F 3/0354* | (2013.01) |
| *G06F 3/01* | (2006.01) |
| *G06F 3/041* | (2006.01) |
| *G06F 3/044* | (2006.01) |

(52) U.S. Cl.
CPC .......... *G06F 3/03545* (2013.01); *G06F 3/017* (2013.01); *G06F 3/0442* (2019.05); *G06F 3/04162* (2019.05)

(58) Field of Classification Search
None
See application file for complete search history.

(56) References Cited

U.S. PATENT DOCUMENTS

| | | | |
|---|---|---|---|
| 2009/0027343 A1* | 1/2009 | Cho ...................... | G06F 3/0317 345/166 |
| 2016/0054851 A1* | 2/2016 | Kim ...................... | G06F 3/0482 345/174 |
| 2017/0010695 A1* | 1/2017 | Pahud .................... | G06F 3/0383 |
| 2018/0117458 A1* | 5/2018 | Andersson .............. | A63F 13/00 |

FOREIGN PATENT DOCUMENTS

JP          2014-35557 A      2/2014

* cited by examiner

*Primary Examiner* — Carl Adams (74) *Attorney, Agent, or Firm* — Seed IP Law Group LLP (57) ABSTRACT

A stylus includes a processor that acquires first coordinate values in a pen coordinate system at an occurrence position of a pen event detected by a pen sensor and acquires second coordinate values in a device coordinate system at the occurrence position of the pen event. The processor uses a plurality of sets of coordinate value pairs to determine conversion parameters for converting coordinates from the pen coordinate system into the device coordinate system and uses the determined conversion parameters and a measured amount of movement of the stylus to calculate coordinate values of the stylus in the device coordinate system.

8 Claims, 7 Drawing Sheets

STYLUS AND POSITION CALCULATION METHOD

BACKGROUND

Technical Field

The present disclosure relates to a stylus and a position calculation method using the stylus.

Background Art

Patent Document 1 discloses an electronic pen that digitalizes a trajectory (that is, a stroke) of a pen tip formed on special paper while reading a pattern on the special paper by using a camera provided on an apparatus.

PRIOR ART DOCUMENT

Patent Document

[Patent Document 1]
Japanese Patent Laid-Open No. 2014-035557

BRIEF SUMMARY

Problem to be Solved by the Disclosure

Incidentally, in relation to a position detection system with a combination of a stylus and an electronic device, the power consumption on the stylus side tends to increase when the positional relationship between the stylus and the electronic device is monitored while wireless communication is performed in both directions between the stylus and the electronic device. Therefore, it is desirable to provide a stylus that can calculate the relative position between the stylus and the electronic device without monitoring the state around the apparatus and that can autonomously select a suitable operation mode according to the obtained relative positional relationship.

However, the electronic pen disclosed in Patent Document 1 can just figure out the relative position only in a positional relationship that enables the pattern on the special paper to be recognized by using the camera, and the electronic pen cannot autonomously calculate the relative position.

An object of the present disclosure is to provide a stylus and a position calculation method that can autonomously calculate the relative position between the stylus and an electronic device.

Means for Solving the Problem

The first aspect of the present disclosure provides a stylus used with an electronic device that can detect a touch position in a device coordinate system, the stylus including: a pen sensor which, in operation, detects a pen event (e.g., a pen-down event or a pen-up event); an inertial sensor which, in operation, measures an amount of movement of the stylus in a pen coordinate system; and a processor which, in operation, acquires first coordinate values in the pen coordinate system at an occurrence position of the pen event detected by the pen sensor, acquires second coordinate values in the device coordinate system at the occurrence position of the pen event, determines conversion parameters for converting coordinates from the pen coordinate system into the device coordinate system using a plurality of sets of coordinate value pairs, the coordinate value pairs being pairs of the first coordinate values and the second coordinate values, and calculates coordinate values of the apparatus on the device coordinate system using the conversion parameters determined and the amount of movement of the stylus measured.

The second aspect of the present disclosure provides a position calculation method performed by a stylus used with an electronic device that can detect a touch position in a device coordinate system. The method includes: detecting a pen event (e.g., a pen-down event or a pen-up event); measuring an amount of movement of the stylus in a pen coordinate system; acquiring first coordinate values in the pen coordinate system at an occurrence position of the pen event detected, acquiring second coordinate values in the device coordinate system at the occurrence position of the pen event, determining conversion parameters for converting coordinates from the pen coordinate system into the device coordinate system using a plurality of sets of coordinate value pairs, the coordinate value pairs being pairs of the first coordinate values and the second coordinate values; and calculating coordinate values of the apparatus on the device coordinate system using the conversion parameters determined and the amount of movement of the stylus measured.

Effect of the Disclosure

According to the present disclosure, the relative position between the apparatus and the electronic device can be autonomously calculated.

MODE FOR CARRYING OUT THE DISCLOSURE

Hereinafter, a preferred embodiment of a stylus and a position calculation method according to the present disclosure will be described with reference to the attached drawings. Note that the disclosure is not limited to the embodiment described later, and it is obvious that the disclosure can be freely changed without departing from the scope of the disclosure. Alternatively, components may be arbitrarily combined as long as there is no technical inconsistency.

<Configuration of Stylus 20>

Figure 1:
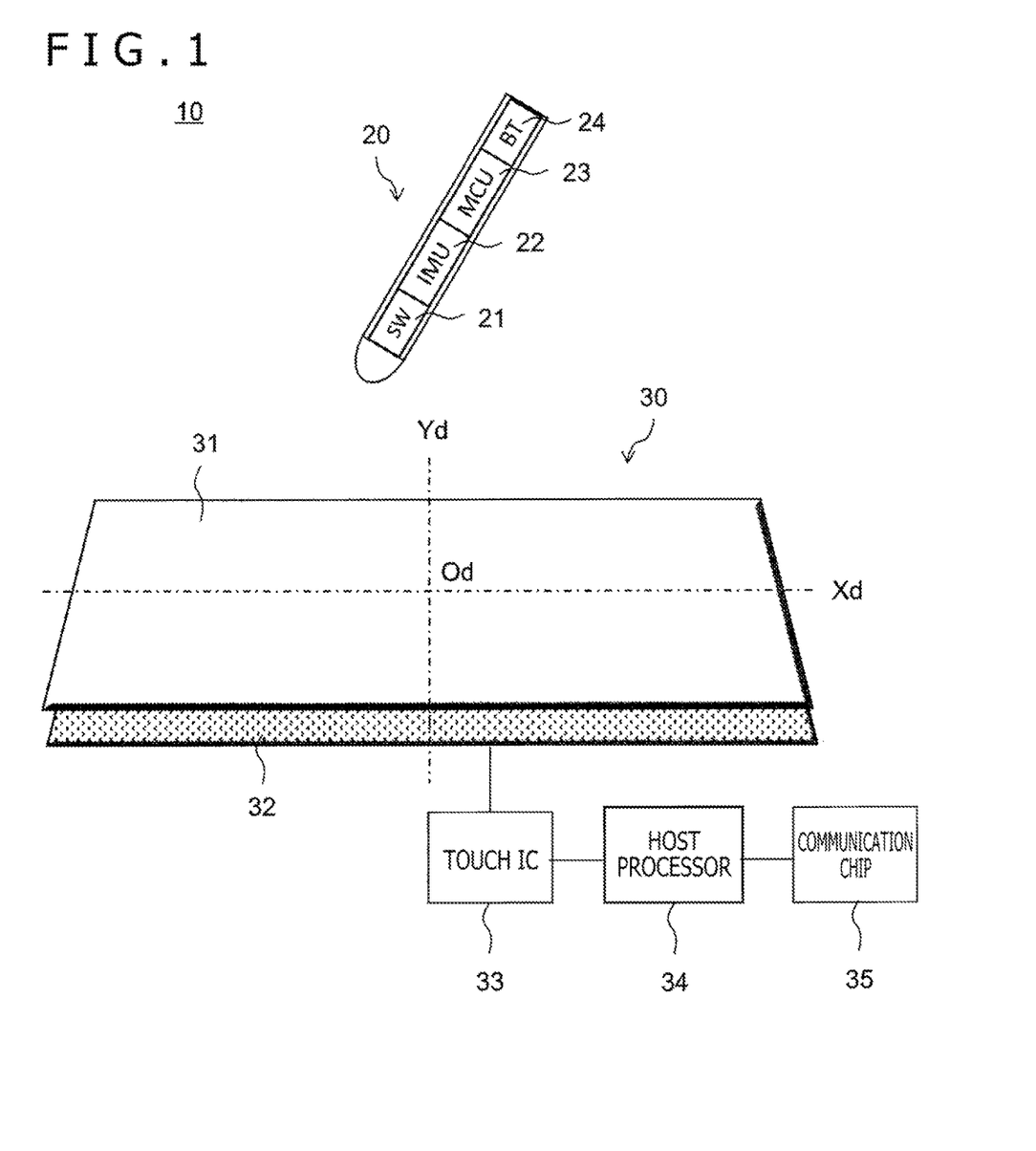
FIG. 1 is an overall configuration diagram of a position detection system provided with a stylus according to an embodiment of the present disclosure.

FIG. 1 is an overall configuration diagram of a position detection system 10 provided with a stylus 20 according to an embodiment of the present disclosure. The position detection system 10 basically includes the stylus 20 that is a pen-type pointing device and an electronic device 30 as a touch device.

The stylus 20 includes a pen pressure switch 21, an inertial measurement unit (hereinafter, IMU 22), a micro control unit (hereinafter, MCU 23), and a communication chip 24.

The pen pressure switch 21 can detect a pen event including a pen-down event and a pen-up event of the stylus 20. The pen pressure switch 21 is, for example, a pressure sensor which includes a variable capacitor that captures a change in a capacitance that changes when a pen tip is pressed.

Figure 2:
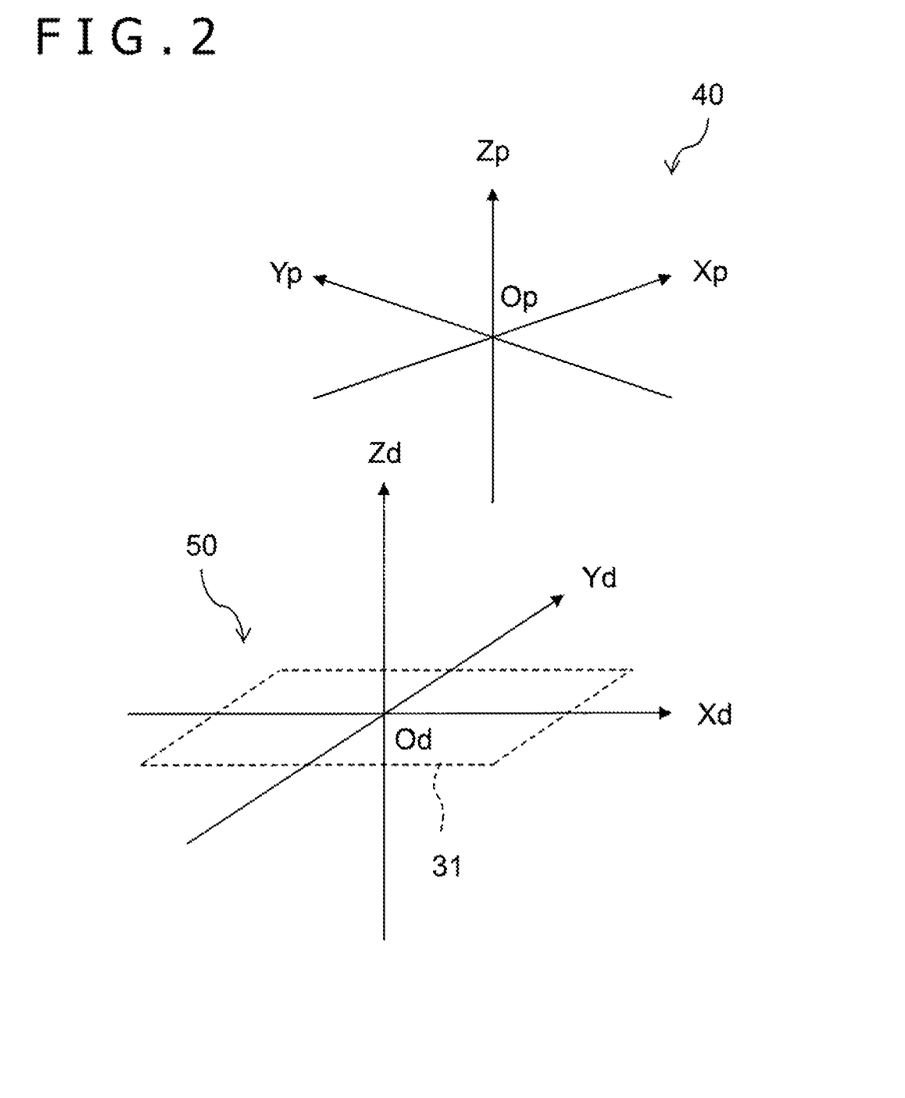
FIG. 2 is a diagram illustrating a positional relationship between a pen coordinate system and a device coordinate system.

The IMU 22 is, for example, a measurement unit with a combination of a three-axis gyro sensor and a three-way acceleration sensor. This allows the IMU 22 to measure the amount of movement of the stylus 20 in a pen coordinate system 40 (FIG. 2).

The MCU 23 is a control unit including a processor that can control operation of the stylus 20. For example, the MCU 23 uses input signals from the pen pressure switch 21 and the IMU 22 to calculate the position of the stylus 20.

The communication chip 24 is an integrated circuit for wirelessly communicating with an external apparatus according to communication standards including BlueTooth (registered trademark). This allows the stylus 20 to receive a radio signal from the electronic device 30 through the communication chip 24 and supply the received signal to the MCU 23.

The electronic device 30 is, for example, a tablet terminal, a smartphone, or a personal computer and includes a sensor electrode group 32, a touch integrated circuit (IC) 33, a host processor 34, and a communication chip 35. The user can hold the stylus 20 with one hand and move the stylus 20 while pressing the pen tip against a touch surface 31 to write a drawing or a character on the electronic device 30.

The sensor electrode group 32 is a cluster of electrodes that can detect a change in capacitance caused by an approach or contact of a conductor. The sensor electrode group 32 includes a plurality of X-line electrodes for detecting the position of an Xd axis of a device coordinate system 50 (FIG. 2) and a plurality of Y-line electrodes for detecting the position of a Yd axis.

The touch IC 33 is an integrated circuit that controls driving of the sensor electrode group 32. The touch IC 33 drives the sensor electrode group 32 based on a control signal supplied from the host processor 34. In this way, the touch IC 33 executes a "pen detection function" for detecting the state of the stylus 20 or a "touch detection function" for detecting a touch by a finger or the like of the user.

The host processor 34 includes a processing operation apparatus including a central processing unit (CPU), a micro-processing unit (MPU), and a graphics processing unit (GPU). The host processor 34 can read and execute programs stored in a memory (not illustrated) to perform various functions including generation of ink data, creation of a display image signal, and control of transmission and reception of data.

The communication chip 35 is an integrated circuit for wirelessly communicating with an external apparatus according to communication standards including BlueTooth (registered trademark). This allows the electronic device 30 to transmit a radio signal including data, such as second coordinate values described later, toward the stylus 20 through the communication chip 35.

FIG. 2 is a diagram illustrating a positional relationship between the pen coordinate system 40 and the device coordinate system 50. The pen coordinate system 40 is a three-dimensional coordinate system including an Xp axis, a Yp axis, and a Zp axis with an origin Op. The origin Op is a reference point that can be freely set by the stylus 20. In addition, the directions of the axes Xp, Yp, and Zp depend on the definition of each axis in the IMU 22.

On the other hand, the device coordinate system 50 is a three-dimensional orthogonal coordinate system including an Xd axis, a Yd axis, and a Zd axis with an origin Od. The origin Od is a fixed point on the touch surface 31. The Xd-Yd plane coincides with a plane direction of the touch surface 31, and the Z axis coincides with a normal direction of the touch surface 31.

<Operation of Stylus 20>

The stylus 20 according to the embodiment is configured in this way. Next, a "position calibration operation" and a "position calculation operation" of the stylus 20 will be described with reference to FIGS. 3 to 7.

Figure 3:
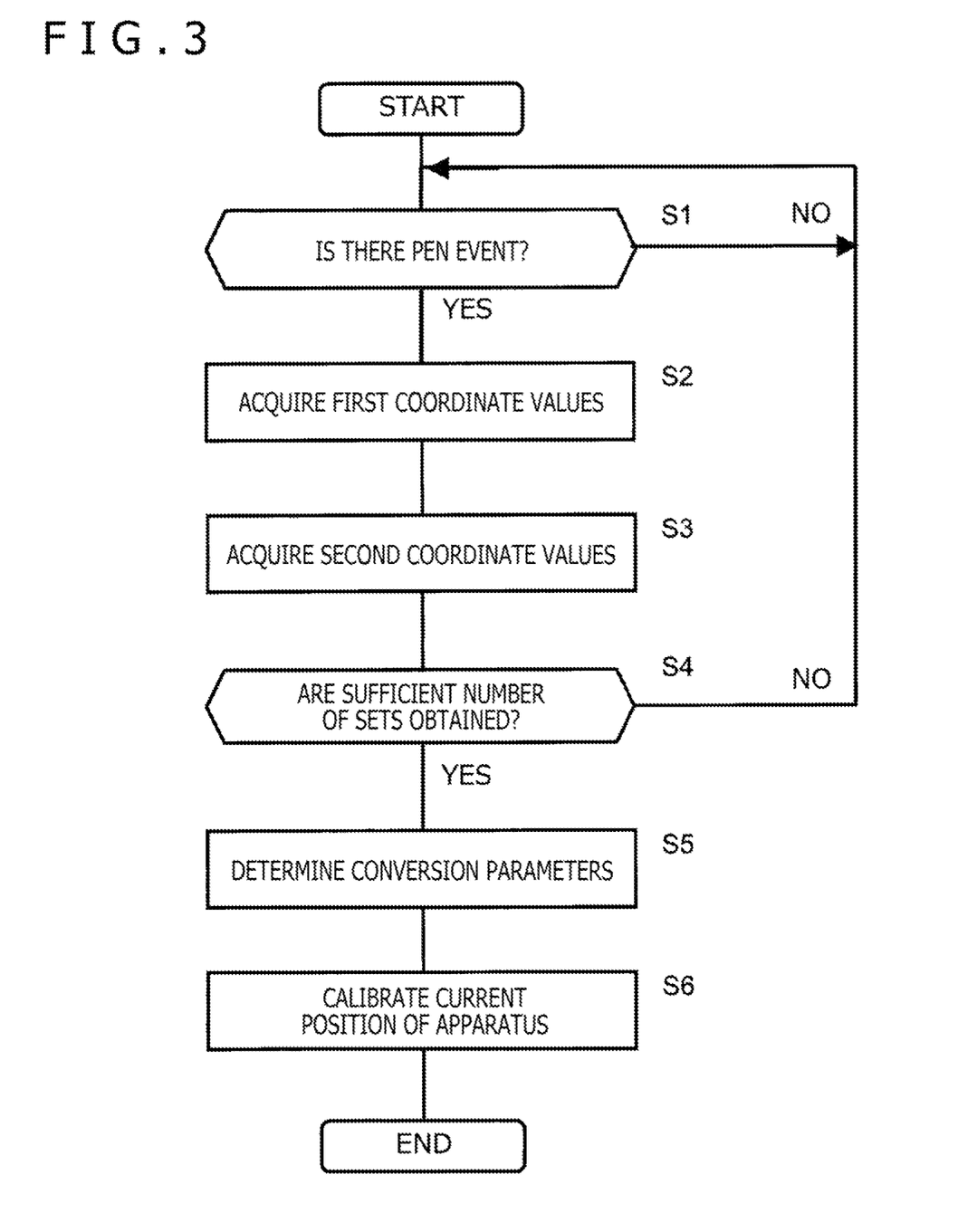
FIG. 3 is a flow chart regarding a position calibration operation of the stylus illustrated in FIG. 1.

FIG. 3 is a flow chart regarding the position calibration operation of the stylus 20 illustrated in FIG. 1. Here, the "position calibration operation" is an operation for associating the pen coordinate system 40 with the device coordinate system 50. Note that prior to the execution of the position calibration operation, the MCU 23 sets the reference point (for example, origin Op) of the pen coordinate system 40 and uses the amount of movement successively measured by the IMU 22 to continuously calculate the position of the stylus 20 in the pen coordinate system 40.

At S1, the MCU 23 determines whether or not there is a pen event generated by the stylus 20. It is desirable that the pen event is an event that may occur under a normal mode of use, and specifically, the pen event includes a pen-up event or a pen-down event. The pen-up/pen-down event is detected by capturing a change in a signal that is output from the pen pressure switch 21. If the pen event is not detected (S1: NO), the MCU 23 stays at S1 until the pen event is detected. On the other hand, if the pen event is detected (S1: YES), the MCU 23 proceeds to S2.

At S2, the MCU 23 acquires coordinate values on the pen coordinate system 40 at occurrence positions 51 and 53 of the pen event detected at S2 (hereinafter, referred to as "first coordinate values").

At S3, the MCU 23 acquires coordinate values on the device coordinate system 50 at the occurrence positions 51 and 53 of the pen event detected at S3 (hereinafter, referred to as "second coordinate values"). Hereinafter, a set of first coordinate values and second coordinate values acquired in the same pen event will be referred to as a "coordinate value pair."

Figure 4:
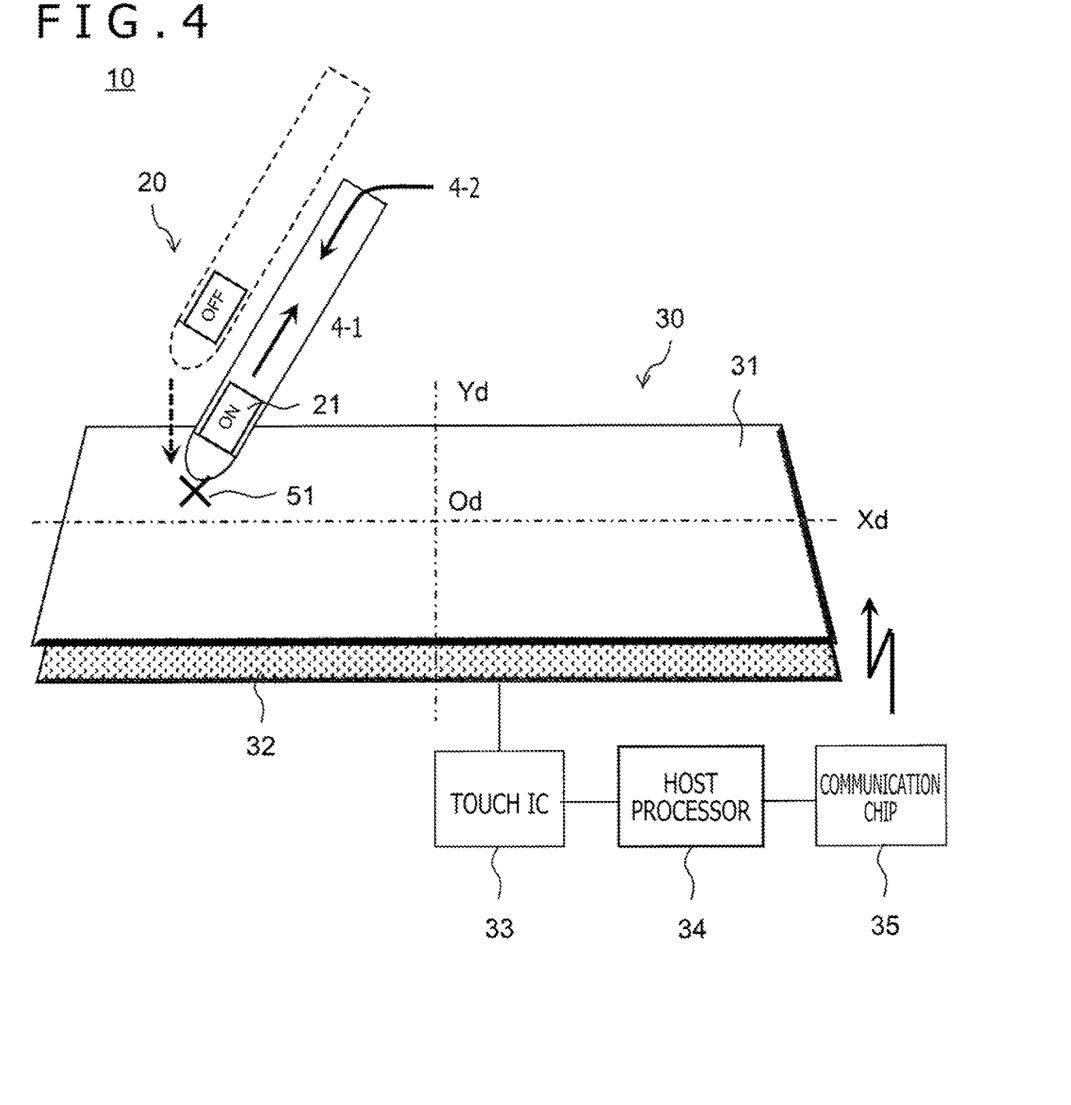
FIG. 4 is a schematic diagram illustrating operation of the position detection system during a pen-down event.

FIG. 4 is a schematic diagram illustrating operation of the position detection system 10 during a pen-down event. For example, when the user performs a pen-down operation at the occurrence position 51 on the touch surface 31, the pen pressure switch 21 is switched from "OFF" to "ON." The MCU 23 uses a measurement signal supplied from the IMU 22 just after the reception of "pen-down" to acquire first coordinate values 4-1 indicating the occurrence position 51. Along with this, the electronic device 30 is triggered by the reception of an uplink signal from the stylus 20 to transmit a downlink signal including second coordinate values 4-2 corresponding to the occurrence position 51. The MCU 23 uses the downlink signal supplied from the communication chip 24 to acquire the second coordinate values indicating the occurrence position 51.

Figure 5:
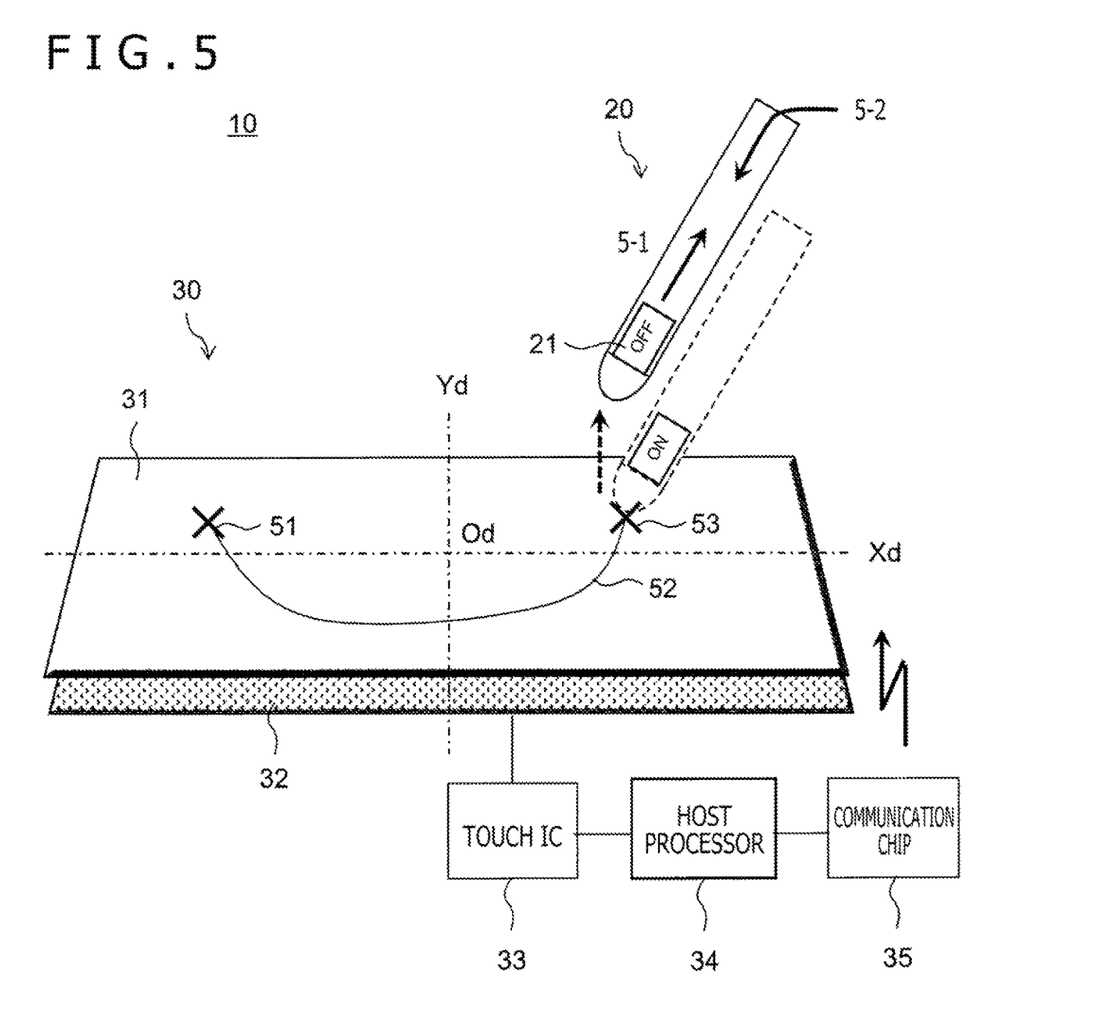
FIG. 5 is a schematic diagram illustrating operation of the position detection system during a pen-up event.

FIG. 5 is a schematic diagram illustrating operation of the position detection system 10 during a pen-up event. For example, when the user moves the pen tip from the occurrence position 51 (start point of stroke) along a trajectory 52 and performs a pen-up operation at the occurrence position 53 (end point of stroke), the pen pressure switch 21 is switched from "ON" to "OFF." The MCU 23 uses a measurement signal output from the IMU 22 just after the reception of "pen-up" to acquire first coordinate values 5-1 indicating the occurrence position 53. Along with this, the MCU 23 acquires second coordinate values 5-2 indicating the occurrence position 53 as in the case of pen-down.

At S4 of FIG. 3, the MCU 23 checks whether or not the number of obtained sets of coordinate value pairs is sufficient for determining conversion parameters described later. If the sufficient number of sets are not obtained yet (S4: NO), the MCU 23 returns to S1 and then sequentially repeats S1 to S4. On the other hand, if the sufficient number of sets (N sets) are obtained (S4: YES), the MCU 23 proceeds to S5.

At S5, the MCU 23 uses the plurality of sets of coordinate value pairs acquired at S3 and S4 to determine the conversion parameters for converting the coordinates from the pen coordinate system 40 into the device coordinate system 50. The conversion parameters are, for example, matrix elements for specifying the three-dimensional affine transformation. In this case, twelve matrix elements and first coordinate values (Xp, Yp, Zp) are used to express second coordinate values (Xd, Yd, Zd) based on the following Equations 1 to 3.

$$Xd = a \cdot Xp + b \cdot Yp + c \cdot Zp + Tx \quad \text{(Equation 1)}$$

$$Yd = d \cdot Xp + e \cdot Yp + f \cdot Zp + Ty \quad \text{(Equation 2)}$$

$$Zd = g \cdot Xp + h \cdot Yp + i \cdot Zp + Tz \quad \text{(Equation 3)}$$

In this case, the degree of freedom of the conversion parameters is "12," and simultaneous linear equations N=12/3=4 are solved to uniquely determine the values of all of the matrix elements. Alternatively, a constraint condition (specifically, c=f=g=h=0) that takes into account the consistency in the vertical direction may be provided to reduce the degree of freedom of the conversion parameters. Alternatively, N>4 may be set, and an optimization method of minimizing a predetermined error function may be used to determine the conversion parameters.

At S6, the MCU 23 uses the conversion parameters determined at S5 to calibrate the current position of the stylus 20. Specifically, the MCU 23 can convert the first coordinate values indicating the current position into the second coordinate values according to Equations (1) to (3). In this way, the position calibration operation of the stylus 20 ends.

Figure 6:
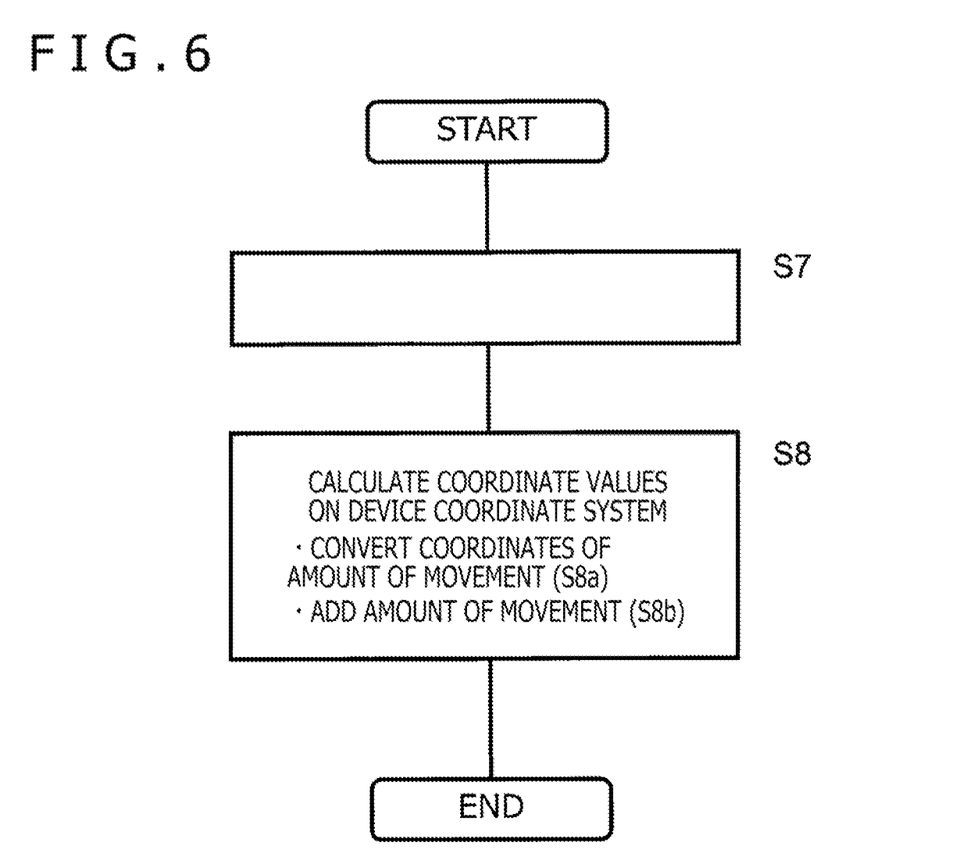
FIG. 6 is a flow chart regarding a position calculation operation of the stylus illustrated in FIG. 1.
Figure 7:
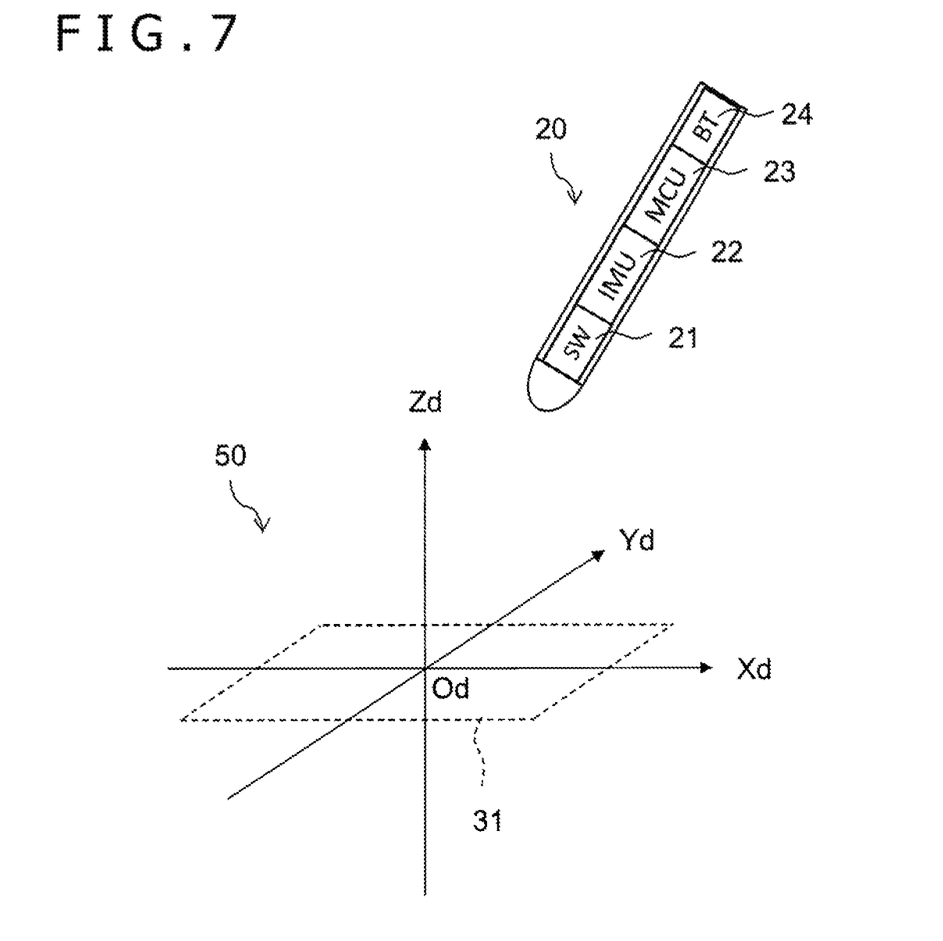
FIG. 7 is a diagram illustrating a position calculation result of the stylus after calibration.

FIG. 6 is a flow chart regarding the position calculation operation of the stylus 20 illustrated in FIG. 1. Here, the "position calculation operation" is an operation for calculating the position on the device coordinate system 50 while reflecting the calibration result of the position.

At S7, the IMU 22 measures an amount of movement ($\Delta Xp$, $\Delta Yp$, $\Delta Zp$) of the stylus 20 in the pen coordinate system 40 and then supplies the amount of movement to the MCU 23.

At S8, the MCU 23 uses the conversion parameters determined at S5 and the amount of movement ($\Delta Xp$, $\Delta Yp$, $\Delta Zp$) of the stylus 20 measured at S7 to calculate the coordinate values (Xd, Yd, Zd) of the stylus 20 in the device coordinate system 50. Specifically, the MCU 23 sequentially converts the coordinates of the amount of movement (S8a of FIG. 6) and adds the amount of movement (S8b of FIG. 6) to calculate and update the coordinate values.

The coordinate value Xd (new) of this time is calculated by using the coordinate value Xd (old) of the last time based on the following Equation 4 and Equation 5.

$$\Delta Xd = a \cdot \Delta Xp + b \cdot \Delta Yp + c \cdot \Delta Zp + Tx \quad \text{(Equation 4)}$$

$$Xd(\text{new}) = Xd(\text{old}) + \Delta Xd \quad \text{(Equation 5)}$$

The coordinate value Yd (new) of this time is calculated by using the coordinate value Yd (old) of the last time based on the following Equation 6 and Equation 7.

$$\Delta Yd = d \cdot \Delta Xp + e \cdot \Delta Yp + f \cdot \Delta Zp + Ty \quad \text{(Equation 6)}$$

$$Yd(\text{new}) = Yd(\text{old}) + \Delta Yd \quad \text{(Equation 7)}$$

The coordinate value Zd (new) of this time is calculated by using the coordinate value Zd (old) of the last time based on the following Equation 8 and Equation 9.

$$\Delta Zd = g \cdot \Delta Xp + h \cdot \Delta Yp + i \cdot \Delta Zp + Tz \quad \text{(Equation 8)}$$

$$Zd(\text{new}) = Zd(\text{old}) + \Delta Zd \quad \text{(Equation 9)}$$

As a result, the MCU 23 of the stylus 20 uses the amount of movement ($\Delta Xp$, $\Delta Yp$, $\Delta Zp$) of the stylus 20 successively measured by the IMU 22 to calculate the three-dimensional position (Xd, Yd, Zd) of the stylus 20 on the device coordinate system 50 as illustrated in FIG. 6. This allows the MCU 23 to determine whether or not the stylus 20 is above the electronic device 30 or measure the clearance between the stylus 20 and the electronic device 30.

In this way, the MCU 23 (processor) of the stylus 20 acquires the first coordinate values on the pen coordinate system 40 at the occurrence position of the pen event detected by the pen pressure switch 21 (pen sensor) (S2 of FIG. 3) and acquires the second coordinate values on the device coordinate system 50 at the occurrence position of the pen event (S3 of FIG. 3). The MCU 23 uses the plurality of sets of coordinate value pairs to determine the conversion parameters for converting the coordinates from the pen coordinate system 40 into the device coordinate system 50 (S5 of FIG. 3) and uses the determined conversion parameters and the measured amount of movement of the stylus 20 to calculate the coordinate values of the stylus 20 in the device coordinate system 50 (S8 of FIG. 6). As a result, after the conversion parameters are determined, the measurement results of the IMU 22 can be successively used to autonomously calculate the relative position between the stylus 20 and the electronic device 30.

DESCRIPTION OF REFERENCE NUMERALS

10 Position detection system, 20 stylus, 21 pen pressure switch (pen sensor), 22 IMU (inertial sensor), 23 MCU (processor), 24, 35 communication chips, 30 electronic device, 31 touch surface, 32 sensor electrode group, 33 sensor IC, 34 host processor, 40 pen coordinate system, 50 device coordinate system, 51, 53 occurrence positions.

What is claimed is:

1. A stylus used with an electronic device that can detect a touch position of the stylus, the stylus comprising:
   an inertial sensor which, in operation, measures an amount of movement of the stylus, the inertial sensor including a three-axis gyro sensor and a three-way acceleration sensor; and
   a processor which, in operation,
      acquires first coordinate values in a first coordinate system at a timing of a pen event, the first coordinate system being within the inertial sensor, acquires second coordinate values in a second coordinate system at the timing of the pen event, wherein a timing at which the first coordinate values are acquired is same as a timing at which the second coordinate values are acquired, and wherein the second coordinate system is different from the first coordinate system and coincides with a touch surface of the electronic device, determines conversion parameters for converting coordinates from the first coordinate system into the second coordinate system using the first coordinate values and the second coordinate values, and calculates coordinate values of the stylus in the second coordinate system using the conversion parameters determined and the amount of movement of the stylus measured.

2. The stylus according to claim 1, wherein the pen event is a pen-down event.

3. The stylus according to claim 1 wherein the pen event is a pen-up event.

4. A position calculation method comprising:

measuring, by an inertial sensor, an amount of movement of a stylus that is used with an electronic device that can detect a touch position of the stylus, the inertial sensor including a three-axis gyro sensor and a three-way acceleration sensor;

acquiring first coordinate values in a first coordinate system at a timing of a pen event, wherein the first coordinate system is within the inertial sensor;

acquiring second coordinate values in a second coordinate system at the timing of the pen event, wherein a timing of the acquiring of the first coordinate values is same as a timing of the acquiring of the second coordinate values, and wherein the second coordinate system is different from the first coordinate system and coincides with a touch surface of the electronic device;

determining conversion parameters for converting coordinates from the first coordinate system into the second coordinate system of the electronic device using the first coordinate values and the second coordinate values; and calculating coordinate values of the stylus in the second coordinate system using the conversion parameters determined and the amount of movement of the stylus measured.

5. The method according to claim 4, wherein the acquiring of the first coordinate values is performed by a processor of the stylus.

6. The method according to claim 4, wherein the acquiring of the second coordinate values is performed by a processor of the stylus.

7. The method according to claim 4, wherein the determining is performed by a processor of the stylus.

8. The method according to claim 4, wherein the calculating is performed by a processor of the stylus.

* * * * *